Nov. 2, 1954  R. M. FLANAGAN  2,693,380
QUICK-DETACHABLE DEVICE
Filed Jan. 17, 1951
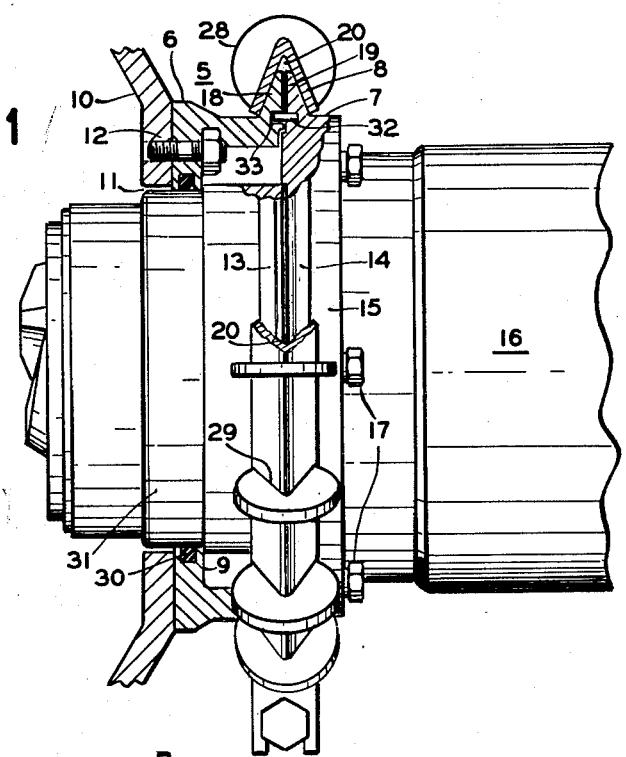
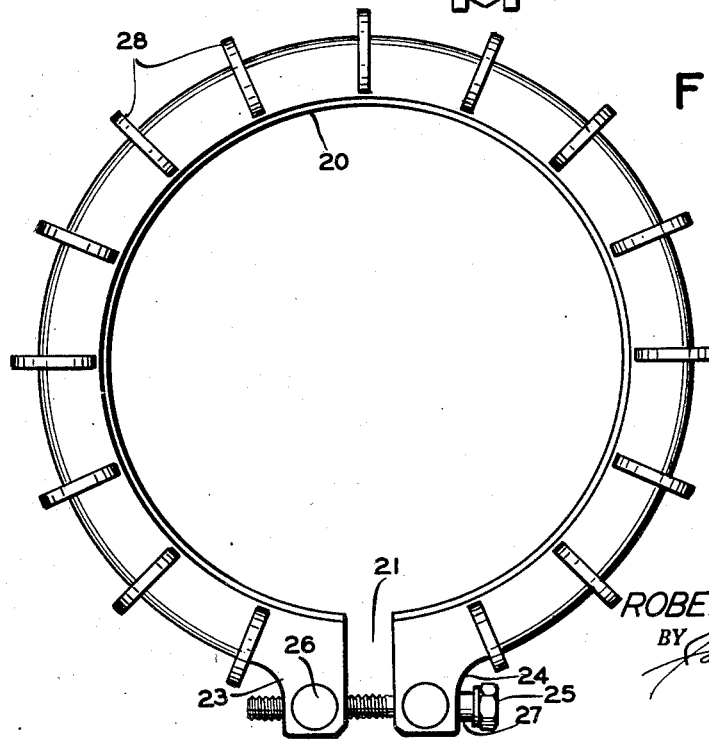
INVENTOR.
ROBERT M. FLANAGAN
BY
ATTORNEY

2,693,380

QUICK-DETACHABLE DEVICE

Robert M. Flanagan, Morris Plains, N. J., assignor to Bendix Aviation Corporation, Teterboro, N. J., a corporation of Delaware Application January 17, 1951, Serial No. 206,465

1 Claim. (Cl. 287—130)

The present invention relates to quick detachable means, such as for mounting accessories to aircraft engines, and particularly to a clamping ring adapted for use in quick detachable means.

Aircraft engines may have several parts detachable therefrom, such as engine starter, generator, fuel pump, supercharger to mention a few, and adapted to be drivably connected to the engine. In service, it is desirable that the accessories may be individually and rapidly replaceable. Thus, it is desirable to have some means to provide for a quick detachable mounting so that, upon failure of one accessory, the craft may not be incapacitated for an undue length of time.

One form of quick disconnect mount utilizes a resilient split ring having a circular channel of substantially V-shape to force together two flanges. However, when the ring is light enough to be resilient, the weight of the accessory, vibration and torque tend to spread the V-shaped channel, thus permitting the flanges to separate. If the ring is made heavy enough to prevent the channel from spreading, it is too unwieldy and will not permit the expansion of the ring for connecting and disconnecting the accessory.

In the present invention, the ring may be made light enough to be resilient and to permit expansion of the ring and yet is reenforced to prevent the V-shaped channel from spreading without materially affecting the resiliency of the ring.

An object of the invention is to provide an improved resilient clamping ring.

Another object of the invention is to provide improved quick disconnect mounting means for engine accessories.

Another object of the invention is to provide a reenforced clamping ring wherein the reenforcements do not affect the resiliency of the ring.

Another object of the invention is to provide a V-shaped clamping ring of improved strength.

The above and other objects and features of the invention will appear more fully hereinafter from a consideration of the following description taken in connection with the accompanying drawings wherein one embodiment of the invention is illustrated by way of example.

In the drawing:

Figure 1 is a partially cutaway side elevation view of an accessory mounted on an engine illustrating the invention.

Figure 2 is an end view of the clamping ring.

Referring now to the drawing, a quick detachable engine accessory mount indicated generally by the numeral 5 comprises an engine adaptor member 6, an accessory adaptor member 7 and a clamp ring 8.

The member 6 has a circumferential flange 9 adapted to be secured to an engine case 10 around an opening 11 therein by studs 12. The opposite end of the member 6 has an outward extending circumferential flange member 13 adapted to abut with a circumferential flange 14 of the member 7. The member 7 is secured to housing 15 of an accessory, indicated generally by the numeral 16, by studs 17. It is understood, however, that the member 7 may be integral with the housing 15. The flanges 13 and 14 are provided with chamfers or bevel margins 18 and 19 at the axially remote sides thereof.

The clamping ring (see Figure 2), has an inwardly opening channel section 20 of substantially V-shape and is split at the periphery 21 to permit its expansion to a larger diameter. Lugs 23 and 24 are provided at the ends formed by the split 21. A screw 25 is provided for expanding the ring 8. One of the lugs has a threaded insert 26 and the other is adapted to hold a collar 27 pinned to the screw 25. Discs 28 are provided with a substantially V-shaped opening 29 adapted to fit the ring 8. The discs 28 are relatively thin and are spaced around the circumference of the ring 8 and attached thereto by welding, brazing or any other suitable method.

The V-shaped ring is made light enough so that it can be spread to go over the flanges 13 and 14. The walls of the V are restrained from spreading by the disc 28, thus providing a ring that is resilient and yieldable yet having sufficient strength to clamp the flange member 13 and 14 securely together. The free diametrical dimensions of the ring 8 are somewhat smaller than those in the installed position to provide the ring 8 with a resilient bias inward.

The flange 9 may be provided with a seal ring 30 adapted to cooperate with a housing portion 31 of the accessory 16 extending into the opening 11 of the engine case 10 to form a seal therebetween.

In order to relieve the ring 8 of torque, pins 32 secured to the member 14 and adapted to be positioned in holes 33 in the member 13 are provided. The number of pins 32 and mating holes 33 required will depend upon the type of accessory to be mounted.

While the discs 28 have been illustrated as round, it is understood that they could be of other configurations such as oval, hexagonal, etc. to give the necessary strength to resist the clamping stress.

Although only one embodiment of the invention has been illustrated and described, various changes in the form and relative arrangement of the parts, which will now appear to those skilled in the art, may be made without departing from the scope of the invention.

What is claimed is:

A lightweight clamping device useful in aircraft for clamping a driven accessory to the driving engine, comprising an open ended hoop spring strip, V shape in cross section, having the V channel about its inner face and the spine of the channel about its outer face, the free ends of the hoop resiliently biased toward one another and adapted to be spread apart to encompass opposed beveled flange members of the engine and accessory in the V channel, bolt means engageable with threaded means at the free ends of the hoop for drawing the walls of the V channel tightly about the flange members and holding them in such tight position, and reinforcing means uniformly about the hoop for preventing the walls in any portion thereof from spreading apart under stress of the load clamped therein, the reinforcing means comprising a plurality of thin discs uniformly spaced about the hoop and each having a V slot complementary to the spine of the hoop, and the walls of the V slot extending across the surface of the walls of the spine and fixed thereto.

References Cited in the file of this patent

UNITED STATES PATENTS

| Number | Name | Date |
|---|---|---|
| 858,463 | Matchette | July 2, 1907 |
| 872,442 | Morris | Dec. 3, 1907 |
| 2,319,518 | Rau | May 18, 1943 |
| 2,368,537 | Gilbert | Jan. 30, 1945 |
| 2,541,205 | Christophersen | Feb. 13, 1951 |